Figure 1:
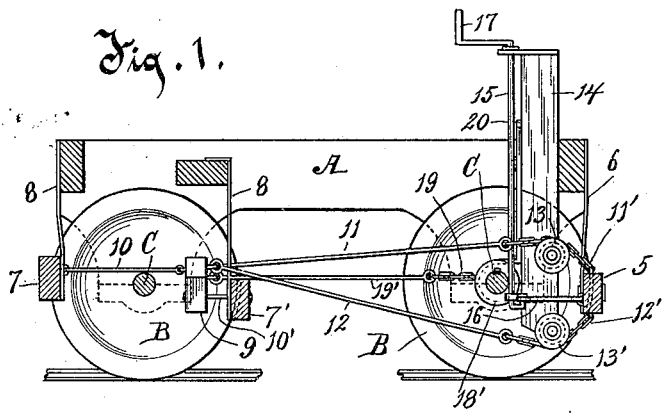

No. 640,069. Patented Dec. 26, 1899.
J. N. & N. P. ZECH.
BRAKE FOR CARS.
(Application filed Sept. 29, 1899.)
(No Model.)

Witnesses.
O. H. Keeney.
Anna C. Faust.

Inventors.
John N. Zech
Nicholas P. Zech
By Benedict & Morsell
Attorneys.

THE NORRIS PETERS CO., PHOTO-LITHO., WASHINGTON, D. C.

UNITED STATES PATENT OFFICE.

JOHN N. ZECH AND NICHOLAS P. ZECH, OF MILWAUKEE, WISCONSIN.

BRAKE FOR CARS.

SPECIFICATION forming part of Letters Patent No. 640,069, dated December 26, 1899.

Application filed September 29, 1899. Serial No. 732,018. (No model.)

*To all whom it may concern:*

Be it known that we, JOHN N. ZECH and NICHOLAS P. ZECH, of Milwaukee, in the county of Milwaukee and State of Wisconsin, have invented a new and useful Improvement in Brakes for Cars, of which the following is a description, reference being had to the accompanying drawings, which are a part of this specification.

Our invention relates to improvements in brakes of a class that are adapted for use on railway-cars, either on steam-railways or street-railways, and includes the means (forming a part of the brake) by which the brake-beams are applied to the wheels of a car.

Our invention consists of the devices and their combinations as herein described and claimed or the equivalents thereof.

In the drawings we have shown a single truck mounted on four wheels in a general form in common use as being sufficient to show our improved brake in connection therewith and fully illustrate the brake and its method of application to the wheels of a car.

Figure 2:
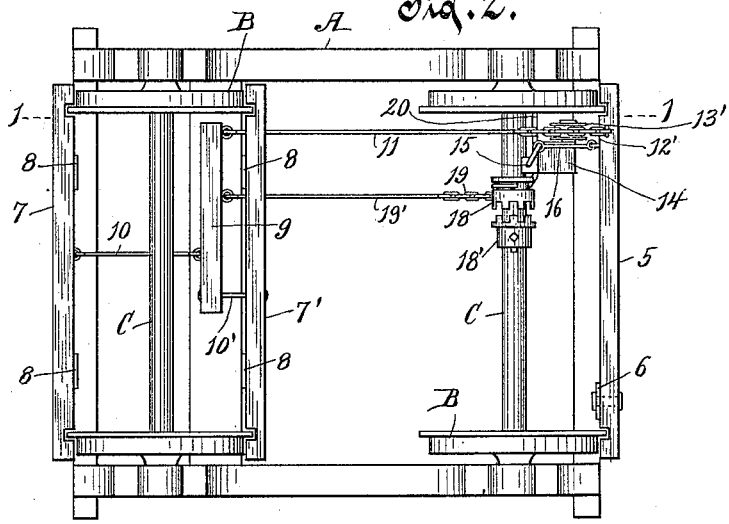
Figure 3:
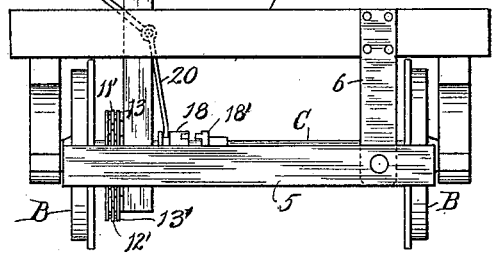

In the drawings, Figure 1 is a vertical longitudinal section of the truck with our improved brake on line 1 1 of Fig. 2 looking downwardly from the section-line on Fig. 2. Fig. 2 is a top plan view of the truck and our improved brake therewith. Fig. 3 is an end view of the truck and brake of that end at the right in Fig. 1.

In the drawings, A is the frame of the truck. B B are the car-wheels, fixed on the axles C C, that have their bearings in suitable boxes therefor on the frame of the truck. The frame and the wheels, with their axles mounted in the frame, form the truck, substantially such as is in common use and which we have considered sufficient to enable us to illustrate the construction and application of our brake to a car.

A brake-beam 5 is suspended by a flexible hanger 6 from the frame of the truck opposite the wheels B on one axle C. The brake-beam is preferably located substantially in the horizontal plane of the axle and is pivoted on the hanger 6, so that it can swing vertically on the hanger limitedly. The hanger 6 is so constructed as to support the brake-beam normally near to, but not against, the wheels B B, the elasticity of the hanger, however, permitting the brake-beam or such shoes (not shown) as it may be provided with to be forced against the wheels. A pair of brake-beams 7 7' are provided, each supported on sets of elastic hangers 8 8, depending from the frame. These hangers 7 7' are located on opposites sides of a pair or pairs of car-wheels, preferably in the horizontal plane of their axle or axles and normally at a little distance therefrom, but so that they can be forced against the car-wheels, the elasticity of the hangers permitting of such movement. A lever 9 is connected by a rod 10 to the brake-beam 7 movably and by a rod 10' to the brake-beam 7'. The rods 10 and 10' are connected to the lever 9 at a little distance apart, but at one and the same side of the middle of the lever. Near the other extremity the lever 9 is connected to the distant brake-beam 5, preferably at its upper and at its lower edge, conveniently by means of rods 11 and 12 and the chains 11' and 12' continuous of the rods. The chains 11' and 12' run, respectively, over idle pulleys 13 13', mounted on the car-truck conveniently by means of a plate or standard 14, fixed on the truck, the pulleys being located, respectively, above and below the horizontal plane of the beam 5.

For actuating the brake-beams to bring the beams or the shoes thereon in contact with the car-wheels a brake-shaft 15 is mounted rotatably on the car-truck or car, it being shown in the drawings for convenience of illustration as so mounted on the standard 14. At the lower end of this shaft 15 it is provided with a crank-arm which is connected eccentrically by a link 16 to the brake-beam 5. The brake-shaft 15 is provided with means for rotating it, which may be a crank-handle 17. When it is desired to force the brakes against the wheels, the shaft 15 is rotated, and thereby the brake-beam 5 at that extremity at least near which the post is connected thereto is forced against the adjacent car-wheel, and the motion of the car-wheel will carry that end of the brake-beam 5 with it either down or up in accordance with the motion of the wheel, and thereby draw on the rod 11 or 12, acting to swing the lever 9, and thereby to draw the beams 7 7' against the car-wheels adjacent thereto. On releasing the shaft 15 the elasticity of the hangers supporting the brake-beams will carry the brake-beams away from the wheels.

As an auxiliary means for applying the brake-beams 7 7' to the car-wheels adjacent thereto we provide a collar 18, loose on an axle C, and connect this collar 18 by a chain 19 (which may, if desired, have a long rod-like link 19') to the lever 9 at the other side from the middle thereof than that at which the brake-beams 7 and 7' are connected. The collar 18 is provided with crown-teeth, and a complementary collar 18', provided with complementary recesses, is fixed on the axle C, the two collars forming the complementary members of a clutch. The collar 18 is also provided with an annular groove therein, and a tilting lever 20, pivoted medially on the truck, rides at one end in the groove in the collar 18. The other extremity of the lever 20 is so disposed, preferably, as to be adapted to be actuated by the foot of the car-attendant as a pedal, whereby the attendant can throw the member 18 into engagement with the member 18', thereby compelling the member 18 to rotate with the axle, thus winding up the chain 19 and forcing the brake-beams 7 7' into engagement with the adjacent car-wheels through the action of the lever 9 and the connecting-rods 10 10'.

What we claim as our invention is—

1. The combination of a pair of brake-beams located on opposite sides of sets of car-wheels, means supporting said brake-beams at a distance from but so as to be capable of being moved against said wheels, a lever connected in opposite directions at a distance apart but near the same end thereof to both said brake-beams, an actuating-beam opposite other sets of car-wheels, said actuating brake-beam being so mounted as to be capable of being tilted in the direction of the motion of the periphery of the adjacent car-wheels, means connecting the actuating brake-beam to said lever in such manner that swinging movement thereof on its pivot will force the pair of brake-beams into contact with their adjacent car-wheels, and other means for bringing the actuating-beam into contact with its adjacent car-wheels.

2. The combination of a pair of brake-beams located on opposite sides of sets of car-wheels, means supporting said brake-beams at a distance from but so as to be capable of being moved against said wheels, a lever connected in opposite directions at a distance apart but near the same end thereof to both said brake-beams, an actuating brake-beam opposite other sets of car-wheels, said actuating brake-beam being so mounted as to be capable of being tilted in the direction of the motion of the periphery of the adjacent car-wheels, a flexible medium connecting the actuating brake-beam to the swinging lever, said connecting medium running over an idle pulley, and means for bringing the actuating-beam in contact with an adjacent car-wheel so as by friction to be moved thereby when the wheel is rotating.

3. The combination of a pair of brake-beams located on opposite sides of sets of car-wheels, means supporting said brake-beams movable toward and from the car-wheels, a lever connected in opposite directions at a distance apart but near the same end thereof to both said brake-beams, an actuating brake-beam opposite other sets of car-wheels, said actuating brake-beam being so mounted as to be capable of being tilted substantially vertically, flexible means running over and under pulleys above and below the horizontal plane of the actuating-beam and connecting the swinging lever to said actuating brake-beam, and means adapted to bring said actuating-beam into contact with an adjacent moving car-wheel.

In testimony whereof we affix our signatures in presence of two witnesses.

JOHN N. ZECH.
NICHOLAS P. ZECH.

Witnesses:
HERM. J. HUCKE,
STEPHEN J. LEAHY.